US008422438B2

(12) United States Patent
Shu et al.

(10) Patent No.: US 8,422,438 B2
(45) Date of Patent: Apr. 16, 2013

(54) DESIGNING POWER SEQUENCES

(75) Inventors: Kodo Shu, Kawasaki (JP); Tsuyoshi Kashima, Yokohama (JP); Sami Savio, Siivikkala (FI); Kari J. Leppänen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1151 days.

(21) Appl. No.: 11/992,029

(22) PCT Filed: Sep. 15, 2005

(86) PCT No.: PCT/IB2005/002737
§ 371 (c)(1),
(2), (4) Date: Dec. 20, 2008

(87) PCT Pub. No.: WO2007/031810
PCT Pub. Date: Mar. 22, 2007

(65) Prior Publication Data
US 2009/0103484 A1    Apr. 23, 2009

(51) Int. Cl.
*H04W 4/00*    (2009.01)
(52) U.S. Cl.
USPC .......................................................... 370/329
(58) Field of Classification Search .................. 370/329; 455/522
See application file for complete search history.

(56) References Cited

U.S. PATENT DOCUMENTS

| | | | |
|---|---|---|---|
| 6,449,462 B1 * | 9/2002 | Gunnarsson et al. | 455/67.13 |
| 7,383,057 B1 * | 6/2008 | Senarath et al. | 455/522 |
| 2002/0058514 A1 | 5/2002 | Senarath et al. | |
| 2005/0070266 A1 | 3/2005 | Senarath et al. | |
| 2006/0009210 A1 | 1/2006 | Rinne et al. | |

FOREIGN PATENT DOCUMENTS

| | | |
|---|---|---|
| CN | 1666454 | 9/2005 |
| EP | 0841826 | 5/1998 |
| EP | 1028484 | 8/2000 |
| WO | WO 2006/077450 | 7/2006 |

* cited by examiner

*Primary Examiner* — Derrick Ferris
*Assistant Examiner* — Farhad Ali
(74) *Attorney, Agent, or Firm* — Ware, Fressola, Maguire & Barber LLP (57) ABSTRACT

The invention relates to the design of power sequences for use in a group of sub-areas of a wireless communication system. Each power sequence defines for one of the sub-areas transmission power values for transmissions using a respective one of a plurality of medium access units. For each of the sub-areas of the group, reception quality values are determined for transmissions between an access station serving the sub-area and mobile stations located at an edge of the sub-area. The reception quality values allow meeting system. The reception quality values are then converted for each of the sub-areas into transmission power values of a power sequence.

25 Claims, 7 Drawing Sheets

DESIGNING POWER SEQUENCES

CROSS REFERENCE TO RELATED APPLICATIONS

This application is the U.S. National Stage of International Application Number PCT/IB2005/002737 filed on Sep. 15, 2005 which was published in English on Mar. 22, 2007 under International Publication Number WO 2007/031810.

FIELD OF THE INVENTION

The invention relates to a method for designing power sequences for use in a group of sub-areas of a wireless communication system. The invention relates equally to chip-hardware, to apparatuses and to a software codes supporting a design of such power sequences. The invention relates moreover to corresponding wireless communication systems and to corresponding software program products.

BACKGROUND OF THE INVENTION

In a wireless communication system, a mobile station is enabled to communicate with an access station of a wireless communication network by means of a connection via a radio interface.

The radio resources, which are available for a particular wireless communication system, can be used in different simultaneous connections without interference by splitting the radio resources up into different channels. For example, in Frequency Division Multiple Access (FDMA), different frequencies are employed for different connections. In Time Division Multiple Access (TDMA), available radio resources are divided into frames, each frame comprising a predetermined number of time-slots. To each connection, a different time-slot may then be assigned in each frame. In Code Division Multiple Access (CDMA), different codes are used in different connections for spreading the data over the bandwidth.

A wireless communication system typically comprises a plurality of fixed stations as access stations, each enabling a communication with mobile stations located in one or more sub-areas served by the fixed station. A sub-area can be for instance a cell of a cellular communication system or a sector of a sectorized wireless communication system. It is to be understood that in case reference is made to a cell in the following, the same applies to a sector.

Using a plurality of cells allows reusing the same channels in various cells. In this case, however, it has to be ensured that interference is kept sufficiently low not only within a respective cell, but also between different cells of the system.

In cellular FDMA/TDMA systems, intra-cell interference is minimized by transmitting signals at different time-slots and/or at different frequency channels in the same cells.

Inter-cell interference can be managed by defining a co-channel reuse distance. That is, the same time-slots/frequencies are only used by cells having a certain reuse distance to each other, the reuse distance being selected such that the co-channel interference between these cells is reduced sufficiently by the path loss of transmitted signals.

However, in order to exploit the available radio resources optimally or to avoid excessive usage of bandwidth, a low frequency-reuse, that is, a very small reuse distance, may be preferred in a FDMA/TDMA system. A small reuse distance implies that the same frequency is reused in cells close to each other. The current working assumptions of 1 Gbps maximum data rate for a 4 G cellular system and 200 Mbps maximum data rate for a 3.9 G cellular system, for instance, result in a high frequency bandwidth requirement. Only a low frequency re-use, optimally a frequency re-use of 'one', allows achieving reasonable multi-operator scenarios with limited total bandwidth availability. A frequency re-use of 'one' implies that all cells may use all available frequency channels.

A small reuse distance may lead to severe inter-cell interference, in particular at the cell edges. For cellular systems having low frequency reuse, inter-cell interference, or co-channel interference if the same frequency channel is used, is thus a critical issue. In this case, a smart Radio Resource Management (RRM) is essential for keeping inter-cell interference at an acceptable level by controlling the transmission power levels employed in each cell.

Figure 1A:
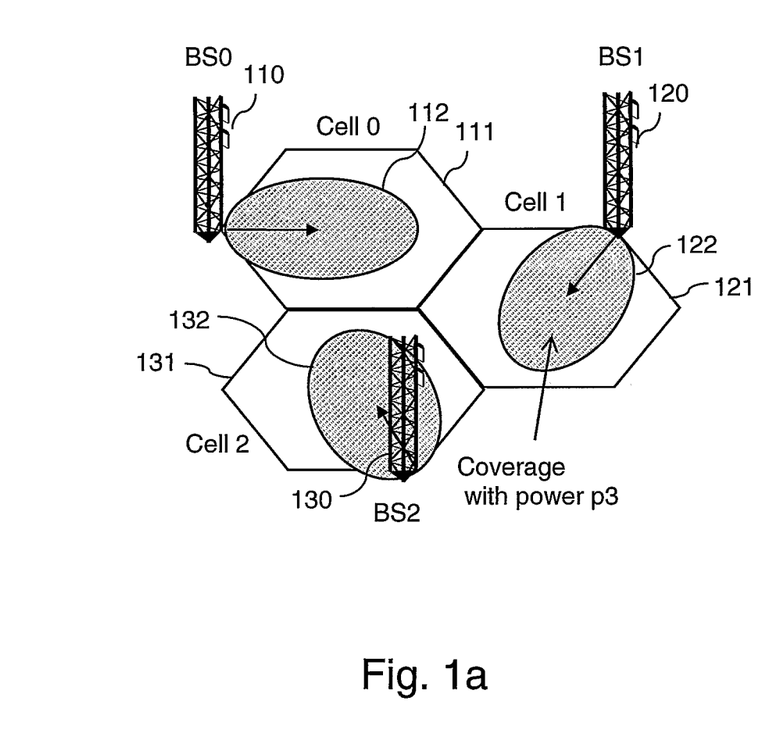
FIG. 1a is a diagram illustrating the influence of the transmission power distribution in a group of three neighboring cells.
Figure 1B:
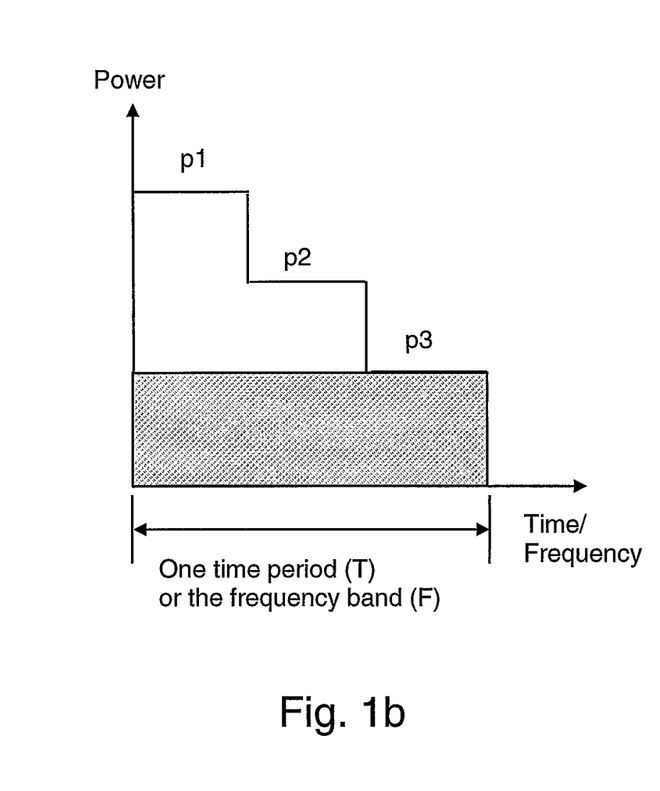
FIG. 1b is a diagram illustrating a transmission power distribution.

The impact of the employed transmission power levels on inter-cell interference is illustrated in FIGS. 1a and 1b.

FIG. 1a presents a part of a cellular communication system, in which three base stations BS0 110, BS1 120 and BS2 130 serve a respective cell, cell 0 111, cell 1 121 and cell 2 131. The base stations 110, 120 130 are located by way of example at a corner of the associated cell 111, 121, 131. The cells 111, 121 and 131 are represented according to the hexagonal model.

FIG. 1b presents an exemplary power sequence employed by one of the base stations, indicating that the transmission power employed by a base station is not constant but may be varied for instance between a high power level p1, a middle power level p2 and a low power level p3. The transmission power may be varied either as a function of time within one time period T, like a radio frame, or as a function of frequency within the employed frequency band F.

FIG. 1a indicates in each cell 111, 121, 131 the respective coverage 112, 122, 132 that is achieved with the lowest transmission power p3 of the power sequence of FIG. 1b. It can be seen as long as all base stations 110, 120 130 use this lowest transmission power p3, there is no interference between the cells. Transmission power p3, however, does not enable a full coverage of the cells, a full coverage requiring the highest transmission power p1 in each cell 111, 121, 131. A transmission power p1, however, does not only guarantee a full coverage of a cell, but will also cause interference in the neighboring cells.

It has been proposed for non-CDMA type systems that transmissions at high power levels in different cells are shifted to different timings. Due to such a time-shift in a low frequency-reuse environment, inter-cell interference can be managed in a way that worst interference situations, resulting from simultaneous transmissions at peak power in different cells, can be avoided.

It also has to be considered that for a continuous coverage, pilot and broadcast channels must be receivable over the whole area of a cell. For an environment in which time-based frequency re-use is generated by specifying timeslot-specific power restrictions for each base station, it has been proposed that the pilot channel, training sequence and system information transmissions take place at fixed positions in the high-power timeslots of a radio frame. This principle is illustrated in FIG. 2.

Figure 2:
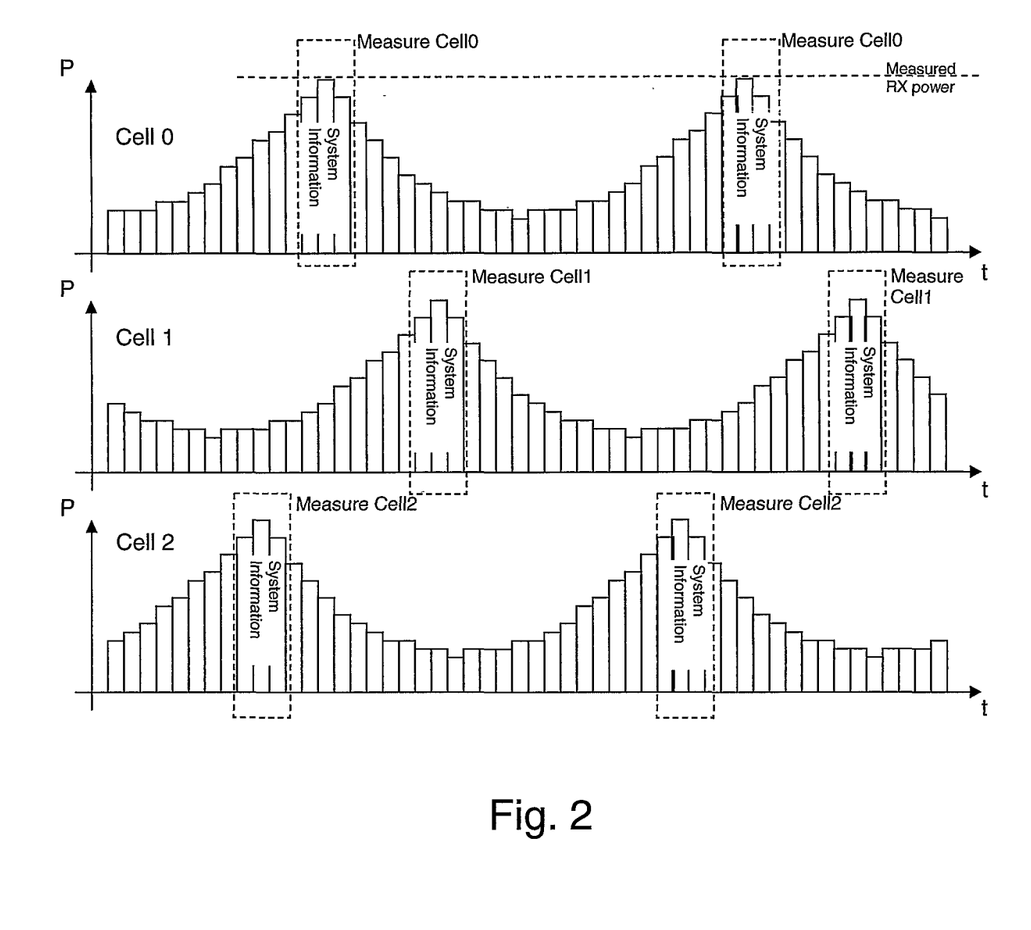
FIG. 2 is a diagram illustrating the timing of pilot channel transmissions to power sequences associated to a group of three cells.

FIG. 2 presents three diagrams. The first diagram indicates the transmission power P over time t for cell 0. The second diagram indicates the transmission power P over time t for cell 1. The third diagram indicates the transmission power P over time t for cell 2. It can be seen that the transmission power varies stepwise from a highest value to a lowest value and back to a highest value again. Further, the respective highest values in the three power sequences are shifted against each other in time. In a synchronized system, it can be guaranteed that this shift is maintained. The time slots to which the highest transmission power is assigned are used in each of the cells for transmitting pilot channel, training sequence and system information. Thus, this information is made available at different times for neighboring base stations. After initial power-on, a mobile station may seeks the preferred cell by looking for the known pilot transmissions. With the defined distribution to the highest transmission power time-slots, it is ensured that a mobile station will be able to receive the system information regardless of its location in a cell.

It has not been proposed so far, however, how to design such power sequences.

SUMMARY OF THE INVENTION

It is an object of the invention to enable a design of suitable power sequences.

A method for designing power sequences for use in a group of sub-areas of a wireless communication system is proposed. Each power sequence defines for one of the sub-areas transmission power values for transmissions using a respective one of a plurality of medium access units. The proposed method comprises, for each of the sub-areas of the group, determining reception quality values for transmissions between an access station serving the sub-area and mobile stations located at an edge of the sub-area. The reception quality values allow meeting system requirements. The proposed method further comprises converting the reception quality values for each of the sub-areas into transmission power values of a power sequence.

Moreover, a chip hardware for supporting a design of power sequences for use in a group of sub-areas of a wireless communication system is proposed. Each power sequence defines for one of the sub-areas transmission power values for transmissions using a respective one of a plurality of medium access units. The chip hardware comprises a processing component adapted to determine for each of the sub-areas of the group reception quality values for transmissions between an access station serving the sub-area and mobile stations located at an edge of the sub-area, which reception quality values allow meeting system requirements. The reception quality values form a basis for determining transmission power values of a power sequence for each of the sub-areas.

Moreover, a complementary chip hardware for supporting a design of power sequences for use in a group of sub-areas of a wireless communication system, each power sequence defining for one of the sub-areas transmission power values for transmissions using a respective one of a plurality of medium access units. This complementary chip hardware comprises a processing component adapted to convert reception quality values for each of the sub-areas into transmission power values of a power sequence, wherein the reception quality values are reception quality values determined for each of the sub-areas for transmissions between an access station serving the sub-area and mobile stations located at an edge of the sub-area, which reception quality values allow meeting system requirements.

It is to be understood that the proposed chip hardware and the proposed complementary chip hardware could be distributed to different chip hardware entities, for instance for use in different apparatuses, but it could also be realized as a single chip hardware entity.

Moreover, apparatuses comprising corresponding processing components are proposed. It has to be noted that the processing components of the apparatuses may be realized in hardware and/or software. They may be realized for instance by a processing unit executing a suitable software code. Alternatively, the apparatuses could simply comprise the proposed chip hardware and/or the proposed complementary chip hardware. The apparatuses can be for example a network element of the wireless communication network and/or an access station of the wireless communication network.

Moreover, a wireless communication system comprising at least one of such apparatuses is proposed.

Moreover, software codes for designing power sequences for use in a group of sub-areas of a wireless communication system is proposed, each power sequence defining for one of the sub-areas transmission power values for transmissions using a respective one of a plurality of medium access units. When being executed in a processing unit, each software code realizes at least one of the steps of the proposed method. It is to be understood that a single software code could also realize all steps of the proposed method.

Finally, software program products are proposed, in which such software codes are stored.

The invention proceeds from the consideration that the designed power sequences should be suited to fulfill system requirements, which can be formulated suitably in terms of a required reception quality. The invention proceeds further from the consideration that the transmissions to or from the edge of a sub-area served by a respective access unit are particularly critical. It is therefore proposed that reception quality values are determined that are suitable for transmissions between an access unit and mobile stations located at the edge of the sub-area served by this access unit, and that these reception quality values are then converted into transmission power values forming the desired power sequences.

It is an advantage of the invention that it allows designing proper power sequences with transmission power values for different medium access units. As a result, an optimal usage of radio resources can be achieved. In comparison to a system using a reuse factor of R, the ability to use all medium access unit in all sub-areas increases the spectral efficiency of the system by a factor of R.

The wireless communication system can be any type of wireless communication system serving a plurality of sub-areas, for instance a mobile communication system, a Wireless Local Access Network (WLAN) or even an ad-hoc communication system. The sub-areas can be any area that is served by an access unit, for instance a cell of a cellular communication system or a sector of a sectorized communication system. The mobile station can be any mobile device that is capable of communicating via a radio interface with an access station, for instance, a mobile phone or a laptop. The access station can be a fixed access station, like a base station of a mobile communication system or of a WLAN, but equally a mobile access station.

The medium access units can be any unit that can be selected by an access station and a mobile station for transmissions. They may be, for example, subsequent portions of a radio frame, like time-slots, or a sequence of entire radio frames. Further, they may be, for example, frequency sub-bands within an available frequency band, or sets of frequency sub-bands within an available frequency band.

The reception quality values for any particular medium access unit for all sub-areas of a group are advantageously determined under consideration of interference restrictions. For example, in case the group comprises three sub-areas, the interference restrictions may be given for each medium access unit by the equation: $a_2=(1+a_0)(1+a_1)/(a_0+2a_0a_1+a_1)-1$. In this equation, $a_0$ is a reception quality value associated to a medium access unit for a first sub-area, $a_1$ is a reception quality value associated to this medium access unit for a second sub-area, and $a_2$ is a reception quality value associated to this medium access unit for a third sub-area.

The reception quality values can be for instance carrier-to-interference (C/I) values, but equally other quality related values, like signal-to-noise ratios, etc.

Reception quality values may be derived from one or more system requirements. It has to be noted that it is not required that all reception quality values are directly derived from such system requirements. Some reception quality values may also be selected simply such that, when used in combination with those reception quality values that are derived from system requirements, the interference restrictions are met.

A first system requirement may relate directly to transmissions to or from the edge of the sub-areas. For this case, determining reception quality values comprises for each of the sub-areas of the group selecting a maximum reception quality value for a selected fraction of the medium access units. This selected fraction is assumed to allow meeting system requirements for transmissions between an access station serving the sub-area and mobile stations located at an edge of the sub-area. That is, dedicated transmission power values are provided for serving mobile stations located at the edge of a sub-area. The fraction may depend on the load situation in the sub-areas.

The system requirements for the maximum reception quality values may comprise, for example, a desired throughput in transmissions between an access station and mobile stations located at an edge of a sub-area served by the access station. This ensures that a desired throughput can be guaranteed even at the edge of the sub-area. This merit is especially useful for highly-loaded communication systems.

Before the reception quality values are converted to transmission power values, they may be arranged in reception quality sequences in the same order in which the transmission power values, to which the reception quality values are converted, are arranged in the power sequences. The maximum reception quality values should then be arranged at different positions in reception quality sequences for each of the sub-areas of the group, in order to minimize interferences.

Determining reception quality values may further comprise for each of the sub-areas of the group selecting minimum reception quality values for at least a selected fraction of the medium access units. The minimum reception quality values correspond to short-range high-throughput reception quality values that allow meeting system requirements for transmissions between an access station serving a sub-area and a mobile station located at an edge of a selected high-throughput portion of the sub-area.

Such minimum reception quality values may be determined by transforming the high-throughput reception quality values based on information about a relation between the high-throughput portion and the sub-area. The information may be given for instance as a percentage value or by the relation of the radius of both areas.

It has to be noted that the expression "minimum reception quality values" does not necessarily mean that these are the lowest determined reception quality values. But providing at least a certain number of these minimum reception quality values ensures that a high throughput can be guaranteed in the high-throughput portion of the sub-area.

Interference problems may be eliminated with a controlled cell-breathing that can be obtained by varying the reception quality values e.g. between determined maximum values and a determined minimum values in several steps. The variation is further selected such that it is shifted between different sub-areas of the group. The cell-breathing may take place in the time-domain, in case the medium access units are time-related units. That is, the mobile stations at the edge of a sub-area will perceive controlled interference from interfering access stations. The cell-breathing may take place in the frequency domain, in case the medium access units are frequency-related units. That is, mobile stations at the edge of a sub-area will perceive controlled co-channel interference at the frequency sub-bands from interfering access units.

Converting the reception quality values for each of the sub-areas into transmission power values of a power sequence may be realized by converting the reception quality values into reception power values and then converting the reception power values into transmission power values based on an assumed path-loss factor. The path-loss factor may be the same or different for the sub-areas.

The power sequences designed for one group may be reused for further groups comprising other constellations of sub-areas of the wireless communication system.

It has to be noted that power sequences may be designed in accordance with the invention for downlink transmissions from access stations to mobile stations, but equally for uplink transmissions from mobile stations to access stations.

The power sequences may comprise a larger number of different transmission power values or a smaller number of different transmission power values. In case a larger number of different transmission power values is used, the needed range can be covered with small increments. As an example, if a downlink frame comprises 24 time slots, there could be 24 different values in the power sequence with e.g. 1 or 2 dB apart. In case a smaller number of different transmission power values is used, the values may be e.g. 5 dB apart, but be repeated within the power sequence. The first option enables a packet scheduling algorithm to find a slot that has just 1 dB of margin, which makes the radio resource usage more accurate.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 3:
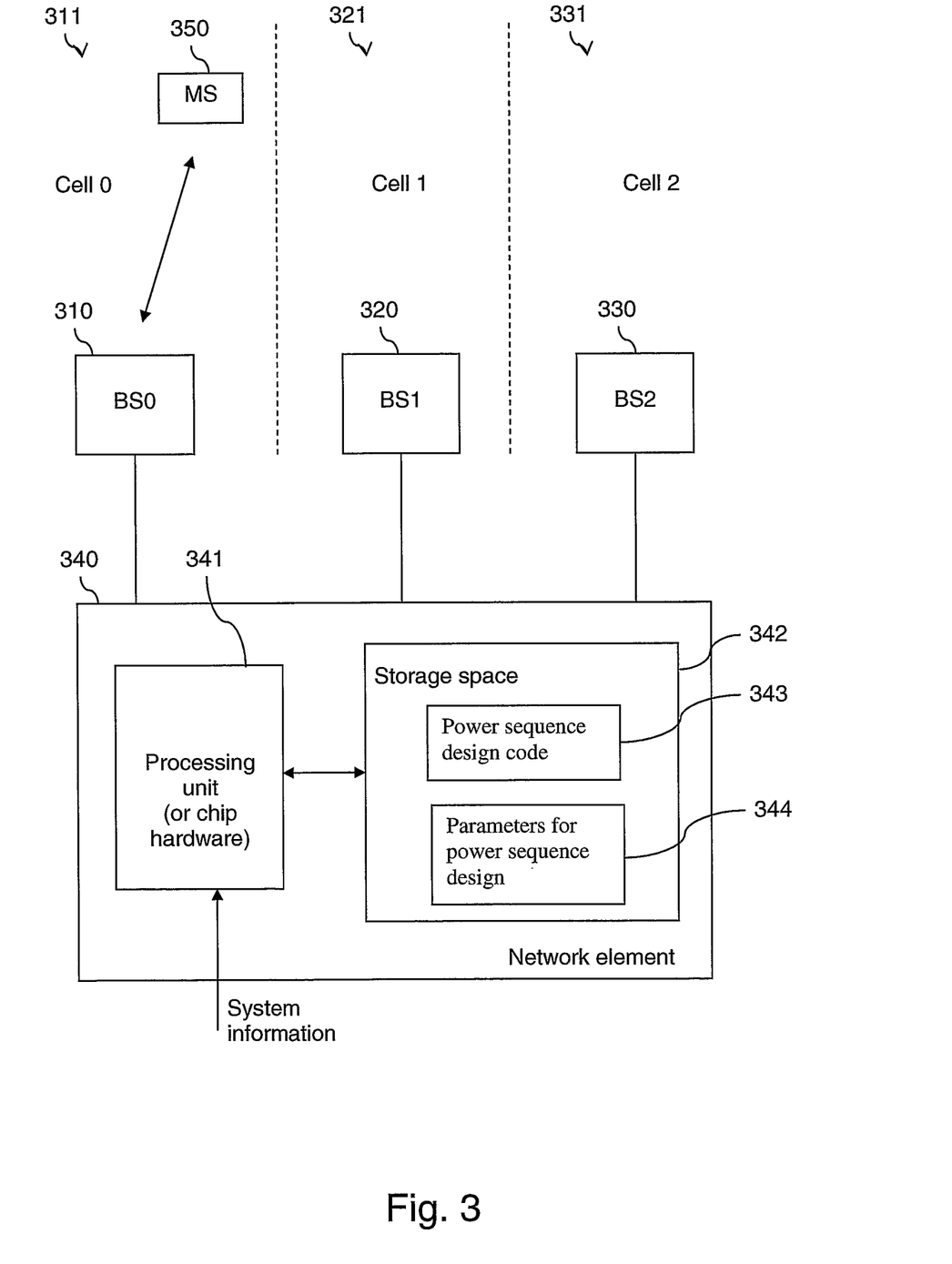
FIG. 3 is a schematic block diagram of a communication system according to an embodiment of the invention.

FIG. 3 is a schematic diagram of a communication system, which allows designing transmission power sequences in accordance with an exemplary embodiment of the invention.

The communication system of FIG. 3 comprises a mobile communication network and a plurality of mobile stations MS.

FIG. 3 shows one of the mobile stations 350 of the communication system. The mobile stations 350 may be designed in a conventional manner.

The mobile communication network comprises a plurality of base stations, each serving at least one cell. All base stations may use the same frequency band. The cells are grouped, each group comprising R cells and each cell belonging to R groups. R is a virtual cell-reuse factor. R distinct transmission power sequences will be designed for R cells of a group. These R distinct power sequences will then be reused in all groups. By way of example, it is assumed that R is equal to three, and FIG. 3 presents three neighboring cells 311, 321, 331 forming one of these groups. Cell 0 311 is served by a first base station BS0 310, cell 1 321 is served by a second base station BS1 320, and cell 2 331 is served by a third base station BS2 330. It is to be understood that the presentation of the cells 311, 321, 331 in FIG. 3 is purely schematic. The geographical relation of the base stations and the cells to each other may be similar as indicated in FIG. 1. Other constellations are possible as well, though. For example, each base station could also cause omni-directional transmissions and thus be positioned at the center of the associated cell. Further, it has to be noted that a cell-reuse factor of 3 is only assumed for the simplicity of explanations. Any other cell-reuse factor could be employed as well.

The mobile communication network moreover comprises further network elements. One of these network elements 340 is depicted in FIG. 3. It is connected either directly or indirectly to all base stations 310, 320, 330 of the mobile communication network.

The network element 340 includes a processing unit 341 that is able to execute various software program codes. The processing unit 340 may access to this end a storage space 342, in which various software program codes are stored. The stored software program codes include at least a power sequence design code 343. The storage space 342 may store in addition system requirement parameters 344. The processing unit 341 may further be arranged to receive additional system information from other network elements not shown. It is to be understood that the functions of the processing unit 341 when executing the power sequence design code 343 could equally be implemented with a chip-hardware.

The mobile communication network can be a conventional mobile communication network that is supplemented with power sequence design features in accordance with an embodiment of the invention. Even the network element 340 may be a conventional network element of a mobile communication network, for instance a base station controller, which is enhanced with power sequence design features.

When performing a downlink transmission in a cell 311, 321, 331, the responsible base station 310, 320, 330 uses the transmission power sequence associated to this cell. Each transmission power sequence assigns a respective transmission power value to each available medium access unit, in order to avoid interferences between the cells. A medium access unit may be, for example, a symbol of a frame or an entire frame and/or a frequency sub-band or a set of frequency sub-bands of an available frequency band. A medium access unit thus corresponds to the time-slots t and/or to the frequency sub-bands f, in which the transmission power level is constant. The same medium access units are re-used in the other cells of one group with a respective other power sequence. The length of one transmission power sequence covers a time period T comprising one or several radio frames and/or the entire frequency band F, respectively.

An exemplary design of transmission power sequences for a group of cells will now be explained in more detail with reference to the flow chart of FIG. 4. The flow chart illustrates the operation of the processing unit 341 of the network element 340 when executing the power sequence design code 343.

At first, four requirement parameters X, y, β and γ are determined for each of the cells 311, 321, 331 (step 401). The parameters are system planning parameters and may be retrieved from the storage space 342, be provided by other elements of the communication network or be computed based on available system information.

Parameter X is a minimum C/I value (in dB) at the cell edge, which ensures a specific link throughput for mobile stations 350 located at the cell edge. Parameter γ indicates the fraction of T or F during which this link throughput should be guaranteed. If it is guaranteed that C/I≧X at the cell edge within the fraction γ·T or γ·F of the medium access units, it is ensured that a seamless coverage is achieved. This is a first system target requirement.

Parameter y is a minimum C/I value (in dB) at the edge of a predetermined area close to the base station, which is required to ensure a maximum link throughput in this predetermined area. In the following, this area will also be referred to as a "high-throughput-area". It has to be noted that y should be guaranteed for all medium access units to achieve the maximum throughput. Otherwise, the peak throughput cannot be guaranteed for any user in the cell. Parameter β defines the size of the "high-throughput-area" as a percentage of the whole cell area.

The C/I value y at the edge of the high-throughput-area is converted into a corresponding C/I value Y at the cell-edge by taking account of parameter β (step 402). This conversion can be implemented for example by using a mapping table. Such a mapping table may be calculated beforehand by using ray-tracing tools or by using theoretical calculations that are based on an F-cell network model. If it is guaranteed that C/I≧Y at the cell edge for all medium access units, the maximum link throughput for the high-throughput-area is guaranteed. This is a second system target requirement.

The cells of a group may use the same X and Y values, or different X and Y values. Further, the same or different γ values may be applied to different cells. Different γ values may be planned beforehand or be obtained from the current user-distributions or bit-rate distributions in the real network. That is, if any cell has more users near the cell edge than the other cells of the same group, a higher γ may be allocated to this cell.

Figure 5A:
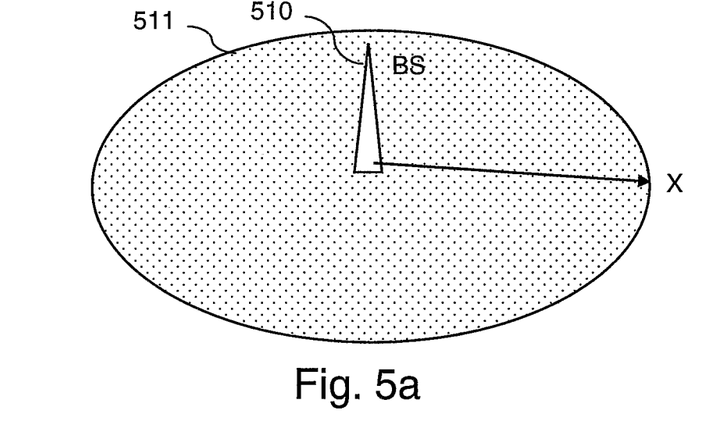
FIG. 5a is a diagram illustrating the impact of a seamless coverage requirement on the operation illustrated in FIG. 4.
Figure 5B:
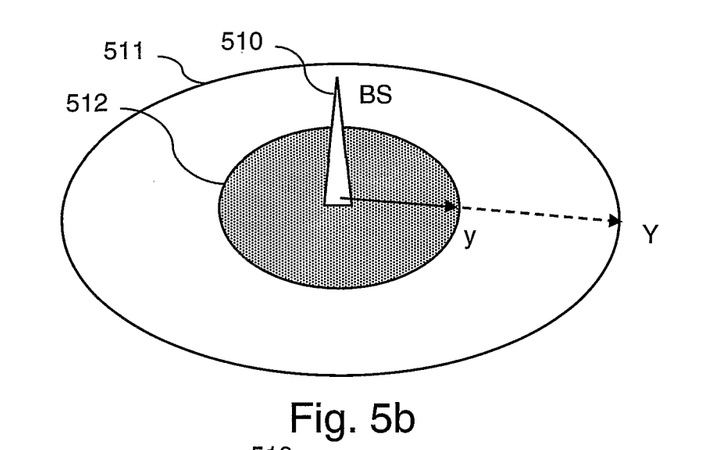
FIG. 5b is a diagram illustrating the impact of a high-throughput-area requirement on the operation illustrated in FIG. 4.
Figure 5C:
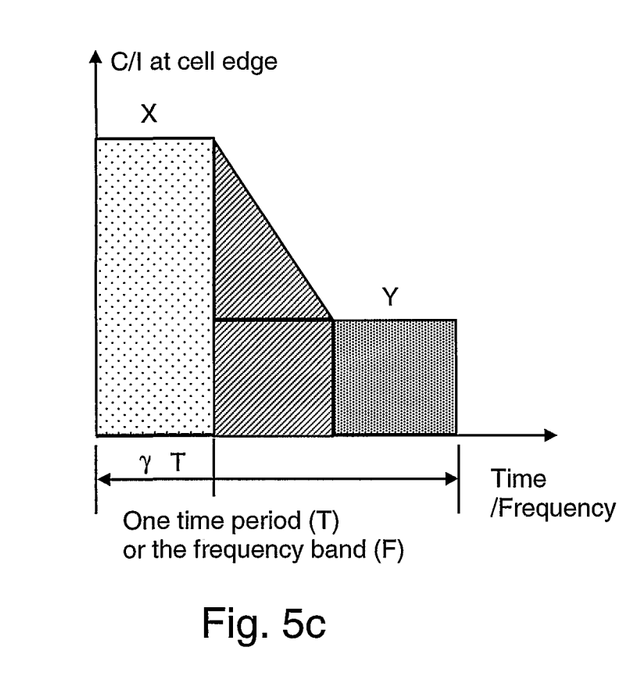
FIG. 5c is a diagram illustrating a C/I design at the cell edge under consideration of the requirements illustrated in FIGS. 5a and 5b.

The relevance of the parameters X, y, Y, γ and β is also illustrated in FIGS. 5a, 5b and 5c. FIG. 5a presents a cell 511 with a base station 510 positioned in the center. At the cell edge, a C/I value of X should be guaranteed occasionally for a seamless coverage. FIG. 5b presents the same cell 511 again. The base station 510 is surrounded by a high-throughput-area 512. The high-throughput-area 512 covers β percent of the area of the entire cell 511. At the edge of this high-throughput-area 512, a C/I value of y should be guaranteed. This corresponds to a C/I value of Y at the edge of the cell 511. FIG. 5c depicts C/I values over medium access units. A fraction γ of the time period T or of the frequency band F should be reserved for C/I values of X. Y is indicated as the lowest required C/I value. The C/I values for the remaining faction of the time period T or the frequency band F should lie between X and Y.

Next, the determined cell-edge C/I values X and Y are distributed to a respective C/I sequence for each of the cells 311, 321, 331.

The three C/I sequences for three individual cells 311, 321, 331 can be expressed as follows:

$$\overline{a_0} = [a_0^1, a_0^2, \ldots, a_0^7];$$

$$\overline{a_1} = [a_1^1, a_1^2, \ldots, a_1^7];$$

$$\overline{a_2} = [a_2^1, a_2^2, \ldots, a_2^7]$$

where $a_i^n$ represents the C/I level for medium access unit n at the edge of cell i, with n=1 to N and i=0 to 2. By way of example, each sequence comprises C/I levels for N=7 medium access units.

For explaining the distribution of the determined cell-edge C/I values X and Y, it is now supposed that the same X and Y values are determined for all three cells 311, 321, 331. The γ values, in contrast, are assumed to be different for different cells 311, 321, 331. For instance, γ could be set to two medium access units for cell 0 311, to three medium access units for cell 1 321 and to two medium access units for cell 2 331. When assigning γ values to the cells, it should be taken care that the sum of the γ values does not exceed the number of values of the C/I sequence, that is, seven in the present case.

First, the X values are distributed such that there is only a single X value at the same position in all sequences (step 403). For the given example of the γ values, the C/I sequences may become for instance:

$$\overline{a_0} = [X, X, \ldots, a_0^7];$$

$$\overline{a_1} = [a_1^1, a_1^2, X, X, X, a_1^6, a_1^7];$$

$$\overline{a_2} = [a_2^1, a_2^2, \ldots, X, X]$$

Figure 6A:
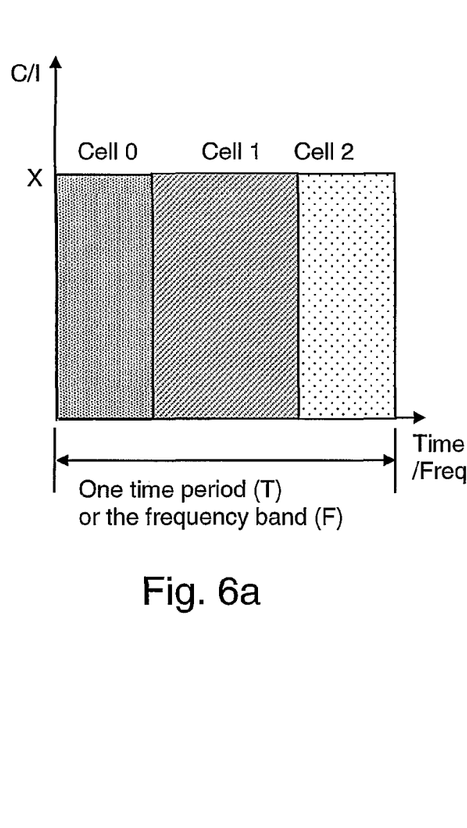
FIG. 6a is a diagram illustrating the distribution of high C/I values to different cells of a group.

This distribution is also illustrated in the diagram of FIG. 6a, which presents the assignment of X values to cell 0, cell 1 and cell 2. For medium access units with an assigned X value, C/I≧X will be guaranteed. In a different and extreme case, γ could be set to be equal to seven for cell 0. In this case, all X values would be assigned to C/I sequence $\overline{a_0}$ and thus to cell 0.

After the X values have been distributed to the C/I sequences, the Y values can be assigned accordingly (step 404). That is, also the Y values are distributed to the remaining medium access units such that there is only a single Y value at the same position in all sequences. For example, for the first two medium access units, there is a freedom to assign a Y value to either cell 1 or cell 2. This assignment is shown as an example:

$$\overline{a_0} = [X, X, \ldots, a_0^7];$$

$$\overline{a_1} = [Y, Y, X, X, X, a_1^6, a_1^7];$$

$$\overline{a_2} = [a_2^1, a_2^2, \ldots, X, X]$$

Figure 6B:
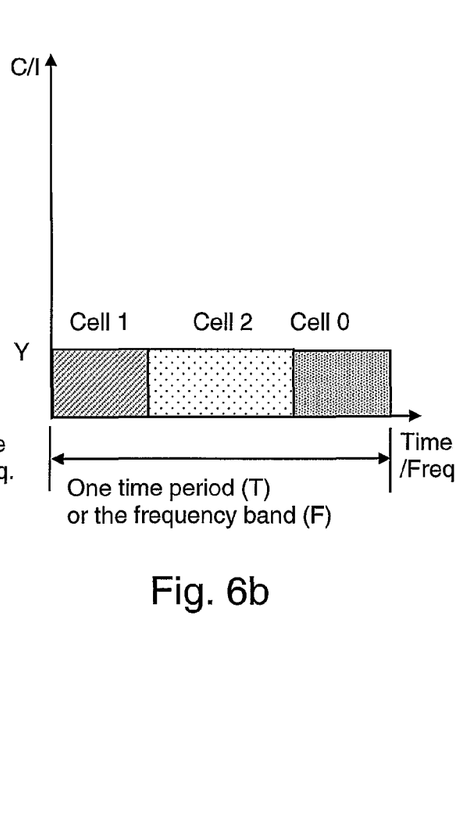
FIG. 6b is a diagram illustrating the distribution of low C/I values to different cells of a group.

Further Y values are distributed to the other two sequences as well. An exemplary distribution of Y values to the C/I sequences for cell 0, cell 1 and cell 2 is also illustrated in the diagram of FIG. 6b. For medium access units with an assigned value of Y, a C/I value below Y is not allowed.

The distribution of C/I values for the cell-edge to the remaining positions in the C/I sequences (step 405) has to comply with interference restrictions which result with the preceding distribution of X and Y values.

As will be derived further below, the required relation between the cell-edge C/I levels can be expressed for a respective single position in the three C/I sequences as:

$$a_2 = (1+a_0)(1+a_1)/(a_0+2a_0a_1+a_1)-1, \quad (1)$$

where $a_0$, $a_1$ and $a_2$ are C/I levels at the respective cell-edge obtained from base stations BS0 310, BS1 320 and BS2 330, respectively. In the above example, it can be assumed for the first position in the C/I sequences that $a_0$=X and $a_1$=Y. Based on the resulting value for $a_2$, the equation allows as well checking whether X and Y have been set to reasonable values or not. For example, in case X and Y values have been set for a particular medium access unit in two C/I sequences, and equation (1) result in a negative value for this medium access unit in the third C/I sequence, this implies that X and Y have not been set to suitable values and should be changed.

Figure 6C:
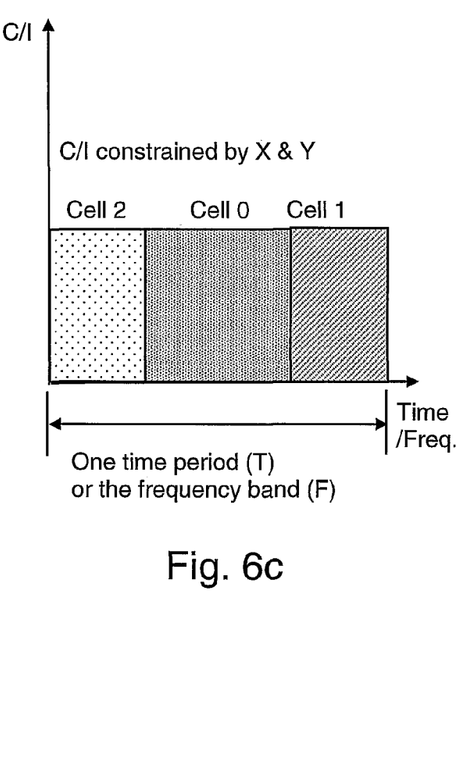
FIG. 6c is a diagram illustrating the distribution of middle C/I values to different cells of a group.

The distribution of C/I values to the remaining positions in the C/I sequences is also illustrated in the diagram of FIG. 6c, which presents the assignment of medium valued C/I values to cell 0 310, cell 1 320 and cell 2 330.

While in FIG. 6c, a step-wise C/I sequences is assumed in the design, a flexible shape of the C/I sequences can be also designed, as long as equation (1) holds for all positions.

After the C/I sequences $\overline{a_0}$, $\overline{a_1}$, and $\overline{a_2}$ have been determined, they are transformed into sequences of received power values at the cell edges (step 406). The sequence of received powers at the cell-edge, $\overline{Rx_0}$, $\overline{Rx_1}$, and $\overline{Rx_2}$, can be determined in different ways, two of which will be described further below.

A transmission power sequence $\overline{Tx_i}$ for each cell i, with i=0 to 2, can then be obtained by scaling the received powers sequences taking into account a path-loss factor:

$$\overline{Tx_i} = \overline{Rx_i} \cdot PL,$$

where PL is the path-loss at the cell-edge (step 407). The path-loss may be obtained for instance from conventional network planning tools. In the above equation, it is assumed that the path-loss is the same for all cells 311, 321, 331. The path-loss could also be cell-specific, though. This scaling is useful in the scenario that different base stations have different maximum transmission powers. This may be case, for instance, with macro base stations and micro base stations. For example, in the scenario that one-macro base station has several micro base stations, the power sequences for different base stations may be scaled by using different path-loss factors.

The resulting transmission power sequences for BS0 310, BS1 320 and BS2 330 can be denoted as follows:

$$BS0 = [\overline{Tx_0}]$$

$$BS1 = [\overline{Tx_1}]$$

$$BS2 = [\overline{Tx_2}]$$

Figure 7A:
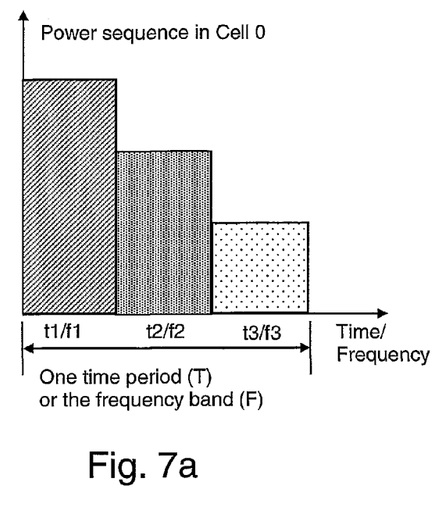
FIG. 7a is a diagram illustrating an exemplary power sequence designed for a first cell of a group.
Figure 7B:
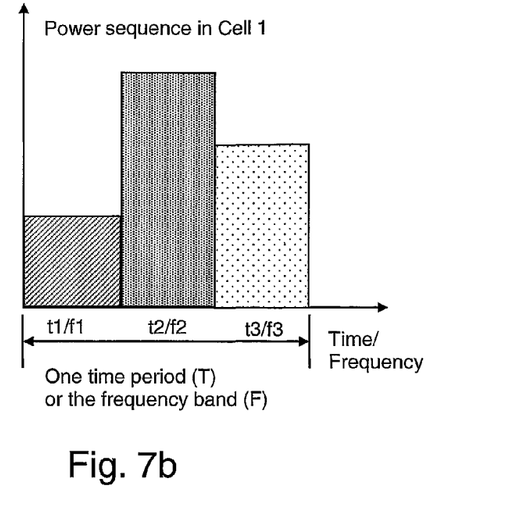
FIG. 7b is a diagram illustrating an exemplary power sequence designed for a second cell of a group.
Figure 7C:
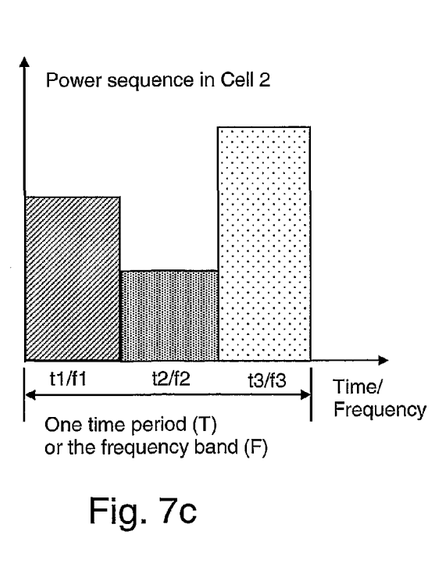
FIG. 7c is a diagram illustrating an exemplary power sequence designed for a third cell of a group.
Figure 7D:
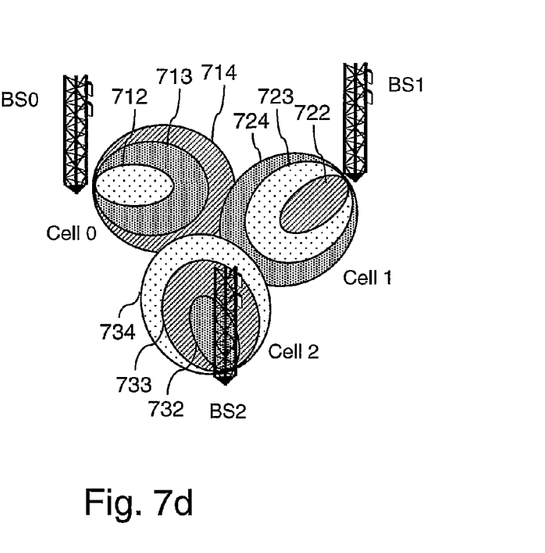
FIG. 7d is a diagram illustrating the coverage areas achieved with each power sequences of FIGS. 7a-7c.

The resulting power sequences are summarized schematically in FIGS. 7a-7d. FIG. 7a presents the power sequence for cell 0. FIG. 7b presents the power sequence for cell 1. FIG. 7c presents the power sequence for cell 2. It has to be noted that the number of power values in the sequences do not correspond to the previously presented examples. Rather, sequences with power values only for three medium access units, namely time slots t1-t3 or frequency sub-bands f1-f3, were used. FIG. 7d illustrates the varying coverage areas of the base station transmissions when using the indicated power values in the associated transmission power sequence. In each cell, a small coverage 712, 722, 732 corresponding to the high-throughput-area is obtained with one medium access unit, a medium coverage 713, 723, 733 is obtained with another medium access unit and a full cell coverage 714, 724, 734 is obtained with yet another medium access unit. A respective medium access unit that is used simultaneously by the three base stations BS0, BS1, BS2 is indicated by the same pattern in all cells, this pattern being used as well as for the associated medium access unit in FIGS. 7a-7c.

As can be seen, the mobile stations 350 at the cell-edge have limited access to medium access units using a high transmission power, due to the low cell-reuse factor. However, with a clever packet scheduling, the mobile stations in different cells can be served in a cooperation fashion. For example, base station 310 may serve the mobile stations close to it, whenever neighboring base station 320 serves the mobile stations at its cell-edge, and vice versa. Further, the system information can be associated to the high power transmissions, as mentioned above with reference to FIG. 2, so that medium access units can be fully utilized in the specific areas of every cell.

The determined power sequences are provided by the network element 340 to the base stations 310, 320, 330. In each base station 310, 320, 330, a variable amplifier is used to set the transmission power for each medium access unit according to the associated values in the power sequence assigned to the base station.

It is to be understood that the conversions of steps 406 and 407 could also be performed by a processing component of the respective base station 310, 320, 330.

The presented transmission power sequence design guarantees that the above indicated system requirements, that is, maximum link throughput in high-throughput-area and seamless coverage, are met, while all cells can use all medium access units. In a similar fashion, this procedure can be applied to the networks with different virtual reuse-factors.

It has to be noted that, in general, the system requirement of the high link throughput in a specific area close to the base station may be defined by three parameters, not only by two as in the example presented above. In the example presented above, the high throughput is fixed to be the maximum air interface throughput, for instance 1 Gbps, and then, a C/I value at the edge of the high-throughput-area is fixed for all medium access units, which guarantees the desired throughput. The high throughput requirement, however, could be variable as well. That is, the high throughput could be set or planned according to service needs. In this case, a further parameter $\alpha$, which is similar to parameter $\gamma$ relating to the requirement on the seamless coverage, is determined and evaluated. The parameter $\alpha$ thus defines a fraction of the medium access units during which the high throughput has to be guaranteed. For example, a setting of 500 Mbps could means that only 50% of the available medium access units have to be used with a transmission power resulting at least in the determined C/I value Y. Hence, the requirement is that C/I>y is guaranteed in $\beta$ percentage of the whole cell area within $\alpha \cdot T$ or $\alpha \cdot F$ medium access units. The parameter $\alpha$ is also indicated as an optional parameter in step 401 of FIG. 4.

In the following, a theoretical derivation of equation (1) and options for determining the received powers $\overline{Rx_n}$ will be explained for the case of three cells in a group.

At the three-cell cross section, received power values $Rx_n$ from base stations n and the corresponding C/I values $a_n$, with n=0-2, approximately have the following relations:

$$a_0 = \frac{Rx_0}{Rx_1 + Rx_2} \quad (2)$$

$$a_1 = \frac{Rx_1}{Rx_2 + Rx_0},$$

$$a_2 = \frac{Rx_2}{Rx_0 + Rx_1}$$

These relations are valid for each medium access unit, for example for each time slot of a radio frame. Only the nearest neighbors are considered, as the pathloss is supposed to be quite high from farther cells.

The above set of equations implies that only those C/I values can be chosen in the cross section, of which the values $a_n$ fulfill the following requirements:

$$Rx_0 - a_0 Rx_1 - a_0 Rx_2 = 0$$

$$-a_1 Rx_0 + Rx_1 - a_1 Rx_2 = 0$$

$$-a_2 Rx_0 - a_2 Rx_1 + Rx_2 = 0$$

This set of equations is solvable for non-zero values of $Rx_0$, $Rx_1$ and $Rx_2$ and positive values of $a_0$, $a_1$, and $a_2$ only, if its determinant is zero. It has to be noted that the values $Rx_n$ are the variables, but the values $a_n$ must fulfill the following condition:

$$a_2 = \frac{(1+a_0)(1+a_1)}{a_0 + 2a_0 a_1 + a_1} - 1$$

This corresponds to above introduced equation (1).

The equation sets some requirements for $a_0$ and $a_1$. If $a_0$ is very small, then $a_2$ is nearly equal to $$\frac{1}{a_1}.$$

It is to be understood that the choices are symmetrical. This leads to the decision that the values of $a_n$ are chosen such that there is one small value, one medium size value and one higher value.

Figure 4:
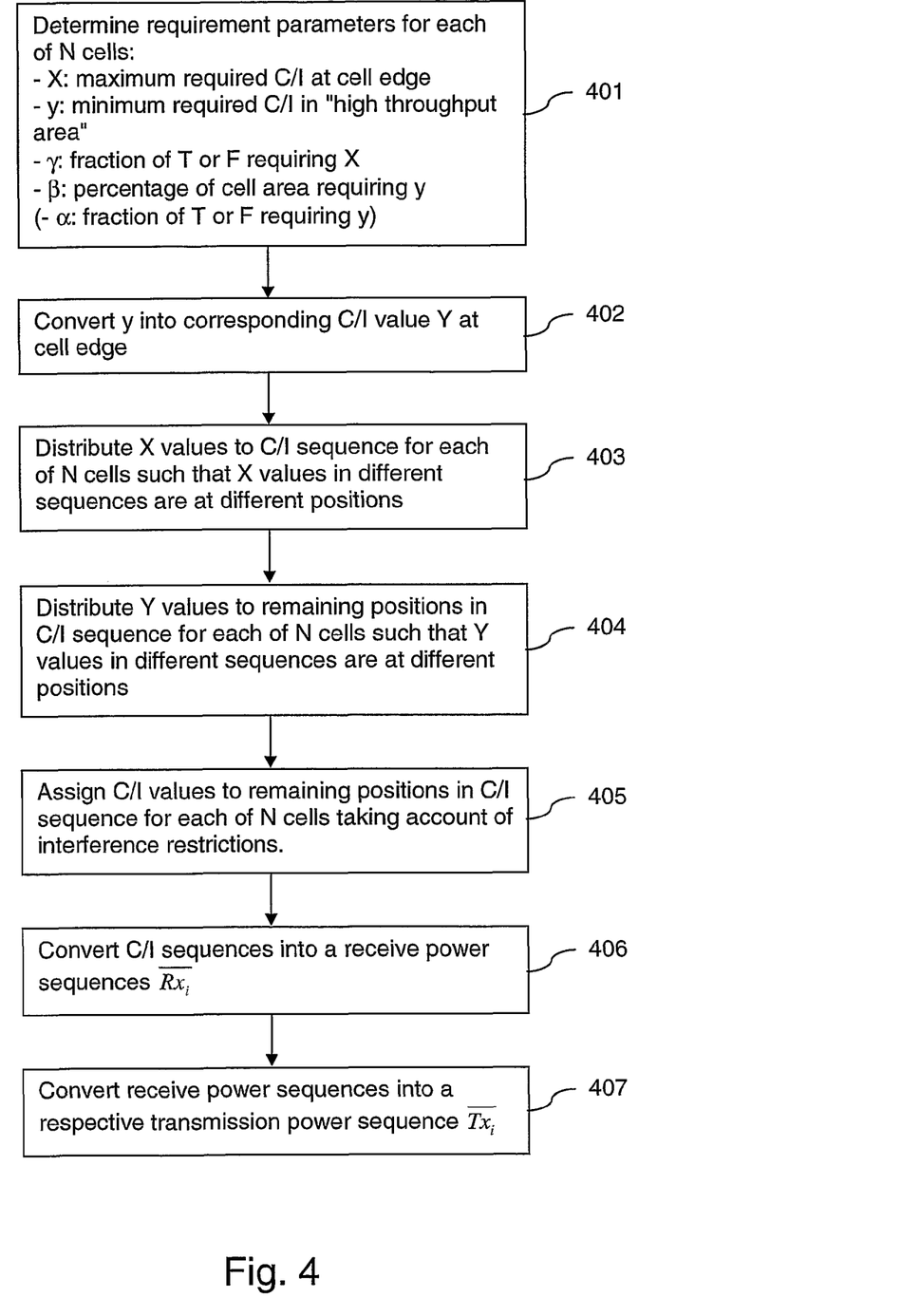
FIG. 4 is a flow chart illustrating an operation in the communication system of FIG. 3.

After the values of $a_n$ have been selected in steps 403-405 of the flow chart of FIG. 4, equation (2) can then be solved in order to obtain appropriate $Rx_n$ values for step 406 of the flow chart of FIG. 4.

In a first alternative, the $Rx_n$ values can be determined based on the following equations:

$$Rx_0 = R$$

$$Rx_1 = \frac{a_0 a_1 + a_1}{a_0 + a_0 a_1} R$$

-continued $$Rx_2 = \frac{1 - a_0 a_1}{a_0 + a_0 a_1}$$

Here, R is some appropriate value, for instance $R=T_{max}/PL$, where $T_{max}$ is the maximum allowed transmission power of the base stations.

In a second alternative, the $Rx_n$ values can be determined based on the following equations:

$$Rx_0 = \frac{a_0}{1+a_0}K$$
$$Rx_1 = \frac{a_1}{1+a_1}K$$
$$Rx_2 = \frac{a_2}{1+a_2}K$$

In these equations, the parameter K is given by $K=Rx_0+Rx_1+Rx_2$. This parameter K may be determined from the noise floor value, from the path loss at cell edge and from the maximum transmission power of the base stations as will be described in the following.

If the maximum transmission power of the base stations is $TxP_{max}$, the transmission powers of three base stations for the same medium access unit could be $TxP_{max}$, $x \cdot TxP_{max}$ and $y \cdot TxP_{max}$, respectively, where x and y should be determined so that the C/I conditions in equation (1) hold. Reasonable examples are x=0.6, y=0.3. In this case, the maximum received powers are $TxP_{max}/PL$, $x \cdot TxP_{max}/PL$ and $y \cdot TxP_{max}/PL$, respectively. When using this kind of snap shot example for a certain medium access unit, K can be calculated as follows:

$$K = \frac{1+x+y}{PL} T \times P_{max}$$

If the noise is also to be included, K can be calculated as follows:

$$K = \frac{1+x+y}{PL} T \times P_{max} + noisefloor$$

Then, using this value of K for all elements of the C/I sequences, the reception power sequences $\overline{Rx_i}$ and the transmission power sequences $\overline{Tx_i}$ can be determined as indicated above.

It has to be noted that in an alternative approach, it would equally be possible to first determine initial, tentative power sequences, to convert the initial power sequences into C/I sequences using e.g. similar equations as presented above, and to check only then whether the obtained C/I sequences meet with defined system requirements. If they do, the initial power sequences can be employed. Otherwise, new tentative power sequences have to be selected for further evaluation. This approach would thus be a trial-and-error approach.

While the presented embodiment relates to downlink transmissions, similar rules can be applied as well for uplink transmissions, to design required C/I sequences.

In the uplink case, the C/I sequences for the cell-edge comprise the C/I values that are to be experienced by the base stations 310, 320, 330 of the group according to system requirements, when a signal is transmitted by a mobile station 350 that is located at the respective cell edge. A first C/I sequence is determined for the first base station 310, a second C/I sequence is determined for the second base station 320 and a third C/I sequence is determined for the third base station 330. The system requirement parameters X, y, Y, γ, β and α can be the same as in the downlink case. Also equation (1) should hold as well for the uplink C/I sequences. The resulting C/I sequences can then be converted into uplink power sequences. The calculations can be carried out again by the network element 340, which provides the resulting power sequences to the base stations 310, 320, 330. The base stations 310, 320, 330 may then signal suitable values from its uplink power sequence to the mobile stations that are located in the cell area 311, 321, 331 served by the respective base station 310, 320, 330.

It is to be noted that the described exemplary embodiment constitutes only one of a variety of possible embodiments of the invention.

What is claimed is:

1. A method comprising:
   for each sub-area of a group of sub-areas of a wireless communication system, determining by a network element of the wireless communication system, reception quality values for transmissions between an access station serving said sub-area and mobile stations located at an edge of said sub-area, which reception quality values allow meeting system requirements; and
   converting said reception quality values for each of said sub-areas into transmission power values of a power sequence, a power sequence defining for one of said sub-areas transmission power values for transmissions using a respective one of a plurality of medium access units,
   wherein reception quality values for a particular medium access unit for all sub-areas of said group are determined under consideration of interference restrictions, and wherein said group of sub-areas comprises three sub-areas, and wherein said interference restrictions are given for each medium access unit by the equation:

$a_2 = (1+a_0)(1+a_1)/(a_0+2a_0a_1+a_1)-1$, where $a_0$ is a reception quality value associated to a medium access unit for a first sub-area, where $a_1$ is a reception quality value associated to said medium access unit for a second sub-area, and where $a_2$ is a reception quality value associated to said medium access unit for a third sub-area.

2. The method according to claim 1, wherein said medium access units corresponds to at least one of:
   portions of a radio frame;
   radio frames;
   frequency sub-bands within an available frequency band; and
   sets of frequency sub-bands within an available frequency band.

3. The method according to claim 1, wherein said reception quality values are carrier-to-interference values.

4. The method according to claim 1, wherein determining reception quality values comprises for each of said sub-areas of said group selecting a maximum reception quality value for a selected fraction of said medium access units, which selected fraction allows meeting system requirements for transmissions between an access station serving said sub-area and mobile stations located at an edge of said sub-area.

5. The method according to claim 4, wherein said system requirements for said maximum reception quality values comprise a desired throughput in transmissions between an access station and mobile stations located at an edge of a sub-area served by said access station.

6. The method according to claim 4, wherein said reception quality values are arranged in reception quality sequences in the same order as the transmission power values, to which said reception quality values are converted, are arranged in said power sequences, and wherein said maximum reception quality values are arranged at different positions in reception quality sequences for each of said sub-areas of said group.

7. The method according to claim 1, wherein determining reception quality values comprises for each of said sub-areas of said group, selecting minimum reception quality values for at least a selected fraction of said medium access units, which minimum reception quality values correspond to high-throughput reception quality values that allow meeting system requirements for transmissions between an access station serving a sub-area and a mobile station located at an edge of a selected high-throughput portion of said sub-area.

8. The method according to claim 7, wherein determining said minimum reception quality values comprises transforming said high-throughput reception quality values based on information about a relation between said high-throughput portion and said sub-area.

9. The method according to claim 1, wherein converting said reception quality values for each of said sub-areas into transmission power values of a power sequence comprises converting said reception quality values into reception power values and converting said reception power values into transmission power values based on an assumed path-loss factor.

10. The method according to claim 1, wherein said power sequences designed for said group are reused for further groups comprising other constellations of sub-areas of said wireless communication system.

11. The method according to claim 1, wherein said power sequences are designed for downlink transmissions from access stations to mobile stations.

12. The method according to claim 1, wherein said power sequences are designed for uplink transmissions from mobile stations to access stations.

13. A chip hardware comprising:
a processing component configured to determine for each sub-area of a group of sub-areas of a wireless communication system, reception quality values for transmissions between an access station serving said sub-area and mobile stations located at an edge of said sub-area, which reception quality values allow meeting system requirements, said reception quality values forming a basis for determining transmission power values of a power sequence for each of said sub-areas, a power sequence defining for one of said sub-areas transmission power values for transmissions using a respective one of a plurality of medium access units,
wherein reception quality values for a particular medium access unit for all sub-areas of said group are determined under consideration of interference restrictions, and
wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ is a reception quality value associated to a medium access unit for a first sub-area, where $a_1$ is a reception quality value associated to said medium access unit for a second sub-area, and where $a_2$ is a reception quality value associated to said medium access unit for a third sub-area.

14. The chip hardware according to claim 13, further comprising a processing component configured to convert reception quality values for each of said sub-areas into transmission power values of a power sequence.

15. A chip hardware comprising:
a processing component configured to convert reception quality values for each sub-area of a group of sub-areas of a wireless communication system into transmission power values of a power sequence, each power sequence defining for one of said sub-areas transmission power values for transmission using a respective one of a plurality of medium access units, wherein said reception quality values are reception quality values determined for each of said sub-areas for transmissions between an access station serving said sub-area and mobile stations located at an edge of said sub-area, which reception quality values allow meeting system requirements,
wherein reception quality values for a particular medium access unit for all sub-areas of said group are determined under consideration of interference restrictions, and
wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ reception alit value associated to a medium access unit for a first sub-area, where $a_1$ is a reception quality value associated to said medium access unit for a second sub-area, and where $a_2$ is a reception quality value associated to said medium access unit for a third sub-area.

16. An apparatus comprising:
a processing component configured to determine for each sub-area of a group of sub-areas of a wireless communication system, reception quality values for transmissions between an access station serving said sub-area and mobile stations located at an edge of said sub-area, which reception quality values allow meeting system requirements, said reception quality values forming a basis for determining transmission power values of a power sequence for each of said sub-areas, a power sequence defining for one of said sub-areas transmission power values for transmissions using a respective one of a plurality of medium access units,
wherein reception quality values for a particular medium access unit for all sub-areas of said group are determined under consideration of interference restrictions, and
wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ reception alit value associated to a medium access unit for a first sub-area, where $a_1$ is a reception quality value associated to said medium access unit for a second sub-area, and where $a_2$ is a reception quality value associated to said medium access unit for a third sub-area.

17. An apparatus according to claim 16, further comprising a processing component configured to convert reception quality values for each of said sub-areas into transmission power values of a power sequence.

18. An apparatus according to claim 16, wherein said apparatus is a network element of said wireless communication network.

19. A wireless communication system comprising an apparatus according to claim 16.

20. An apparatus comprising:
a processing component configured to convert reception quality values for each sub-area of a group of sub-areas of a wireless communication system into transmission power values of a power sequence, each power sequence defining for one of said sub-areas transmission power values for transmission using a respective one of a plurality of medium access units, wherein said reception quality values are reception quality values determined for each of said sub-areas for transmissions between an access station serving said sub-area and mobile stations located at an edge of said sub-area, which reception quality values allow meeting system requirements, wherein reception quality values for a particular medium access unit for all sub-areas of said group are determined under consideration of interference restrictions, and wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ is a reception quality value associated to a medium access unit for a first sub-area, where $a_1$ reception quality value associated to said medium access unit for a second sub-area, and where $a_2$ is a reception quality value associated to said medium access unit for a third sub-area.

21. The apparatus according to claim 20, wherein said apparatus is an access station serving one of said sub-areas.

22. A non-transitory readable medium stored with software code, realizing the following steps when being executed in a processing unit:

for each sub-area of a group of sub-areas of a wireless communication system, determining reception quality values for transmissions between an access station serving said sub-area and mobile stations located at an edge of said sub-area, which reception quality values allow meeting system requirements, said reception quality values forming a basis for determining transmission power values of a power sequence for each of said sub-areas, a power sequence defining for one of said sub-areas transmission power values for transmissions using a respective one of a plurality of medium access units, wherein reception quality values for a particular medium access unit for all sub-areas of said group are determined under consideration of interference restrictions, and wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ is a reception quality value associated to a medium access unit for a first sub-area, where $a_1$ is a reception quality value associated to said medium access unit for a second sub-area, and where $a_2$ is a reception quality value associated to said medium access unit for a third sub-area.

23. The non-transitory readable medium according to claim 22, further realizing the following when being executed in a processing unit:

converting said reception quality values for each of said sub-areas into transmission power values of a power sequence.

24. A non-transitory readable medium stored with software code, realizing the following when being executed in a processing unit:

converting reception quality values for each of a group of sub-areas of a wireless communication system into transmission power values of a power sequence, each power sequence defining for one of said sub-areas transmission power values for transmission using a respective one of a plurality of medium access units, wherein said reception quality values are reception quality values determined for each of said sub-areas for transmissions between an access station serving said sub-area and mobile stations located at an edge of said sub-area, which reception quality values allow meeting system requirements, wherein reception quality values for a particular medium access unit for all sub-areas of said group are determined under consideration of interference restrictions, and wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ is a reception quality value associated to a medium access unit for a first sub-area, where $a_1$ is a reception quality value associated to said medium access unit for a second sub-area, and where $a_2$ is a reception quality value associated to said medium access unit for a third sub-area.

25. An apparatus comprising:

means for determining, for each sub-area of a group of sub-areas of a wireless communication system, reception quality values for transmissions between an access station serving said sub-area and mobile stations located at an edge of said sub-area, which reception quality values allow meeting system requirements; and means for converting said reception quality values for each of said sub-areas into transmission power values of a power sequence, a power sequence defining for one of said sub-areas transmission power values for transmissions using a respective one of a plurality of medium access units, wherein reception quality values for a particular medium access unit for all sub-areas of said group are determined under consideration of interference restrictions, and wherein said group of sub-areas comprises three sub-areas, and wherein said interference restrictions are given for each medium access unit by the equation:

$$a_2=(1+a_0)(1+a_1)/(a_0+2a_0a_1+a_1)-1,$$

where $a_0$ is a reception quality value associated to a medium access unit for a first sub-area, where $a_1$ is a reception quality value associated to said medium access unit for a second sub-area, and where $a_2$ is a reception quality value associated to said medium access unit for a third sub-area.

* * * * *